(12) United States Patent
Krishnamurthy et al.

(10) Patent No.: US 10,713,317 B2
(45) Date of Patent: Jul. 14, 2020

(54) CONVERSATIONAL AGENT FOR SEARCH

(71) Applicant: ADOBE INC., San Jose, CA (US)

(72) Inventors: Balaji Krishnamurthy, Kailash Dham (IN); Shagun Sodhani, Vasundhra Enclave (IN); Aarushi Arora, Faridabad (IN); Milan Aggarwal, Pitampura (IN)

(73) Assignee: ADOBE INC., San Jose, CA (US)

( * ) Notice: Subject to any disclaimer, the term of this patent is extended or adjusted under 35 U.S.C. 154(b) by 468 days.

(21) Appl. No.: 15/419,497

(22) Filed: Jan. 30, 2017

(65) Prior Publication Data

US 2018/0218080 A1    Aug. 2, 2018

(51) Int. Cl.
| | |
|---|---|
| *G06F 16/9535* | (2019.01) |
| *G06F 16/9032* | (2019.01) |
| *G06N 3/00* | (2006.01) |
| *G06N 20/00* | (2019.01) |
| *G06F 40/30* | (2020.01) |
| *G06F 40/35* | (2020.01) |
| *G06N 3/08* | (2006.01) |
| *G06N 7/00* | (2006.01) |

(52) U.S. Cl.
CPC .... *G06F 16/9535* (2019.01); *G06F 16/90332* (2019.01); *G06F 40/30* (2020.01); *G06F 40/35* (2020.01); *G06N 3/006* (2013.01); *G06N 3/08* (2013.01); *G06N 20/00* (2019.01); *G06N 7/005* (2013.01)

(58) Field of Classification Search
CPC ............... G06F 16/3329; G06F 17/279; G06F 16/9535; G06F 40/30; G06F 40/35; G06F 16/90332; G06N 3/006; G06N 3/004; G06N 3/08; G06N 20/00; G06N 7/005
See application file for complete search history.

(56) References Cited

U.S. PATENT DOCUMENTS

| | | | | |
|---|---|---|---|---|
| 7,409,335 | B1 * | 8/2008 | Horvitz | G06F 16/35 704/9 |
| 2006/0224535 | A1 * | 10/2006 | Chickering | G06N 20/00 706/16 |

(Continued)

OTHER PUBLICATIONS

Cuayahuitl, Heriberto et al., "Spatially-aware dialogue control using hierarchial reinforcement learning" ACM Transactions on Speech and Language Processing, (TSLP) 7.3 (2011); as cited on IDS of Feb. 2, 2017 Item 16 (no copy furnished) (Year: 2011).*

(Continued)

*Primary Examiner* — David T. Brooks
(74) *Attorney, Agent, or Firm* — Shook, Hardy & Bacon LLP

(57) ABSTRACT

A conversational agent facilitates conversational searches for users. The conversational agent is a reinforcement learning (RL) agent trained using a user model generated from existing session logs from a search engine. The user model is generated from the session logs by mapping entries from the session logs to user actions understandable by the RL agent and computing conditional probabilities of user actions occurring given previous user actions in the session logs. The RL agent is trained by conducting conversations with the user model in which the RL agent selects agent actions in response to user actions sampled using the conditional probabilities from the user model.

19 Claims, 5 Drawing Sheets

(56) References Cited

U.S. PATENT DOCUMENTS

| | | | | |
|---|---|---|---|---|
| 2010/0063823 | A1* | 3/2010 | Wu | G10L 15/18 704/275 |
| 2012/0041903 | A1* | 2/2012 | Beilby | G06N 3/004 706/11 |
| 2012/0290293 | A1* | 11/2012 | Hakkani-Tur | G06F 16/951 704/9 |
| 2012/0290509 | A1* | 11/2012 | Heck | G10L 15/06 706/11 |
| 2012/0310961 | A1* | 12/2012 | Callison | G09B 7/00 707/756 |
| 2015/0066479 | A1* | 3/2015 | Pasupalak | G06F 17/27 704/9 |
| 2015/0370787 | A1* | 12/2015 | Akbacak | G06F 17/2836 704/2 |
| 2016/0012103 | A1* | 1/2016 | Zhao | G06F 16/2423 707/722 |
| 2017/0140755 | A1* | 5/2017 | Andreas | G06F 17/241 |
| 2017/0286860 | A1* | 10/2017 | Chen | G06N 3/0454 |
| 2017/0308535 | A1* | 10/2017 | Agarwal | G06N 7/005 |
| 2017/0337478 | A1* | 11/2017 | Sarikaya | G06F 3/167 |
| 2018/0060301 | A1* | 3/2018 | Li | G06F 17/2775 |

OTHER PUBLICATIONS

25 Chatbot Startups You Should Know, VentureRadar, Jun. 14, 2016, 11 pages. http://blog.ventureradar.com/2016/06/14/25-chatbot-startups-you-should-know.
Build a Facebook bot without coding, Chatfuel, 7 pages, 2016. Available at: https://chatfuel.com/.
Scale Incident Investigation, Response and Reporting, Demisto, 2016, 4 pages. Available at: https://www.demisto.com.
Human + AI Customer Service, Digital Genius, 2016, 5 pages. Available at: http://digitalgenius.com/.
Chatting with Skype bots feels like talking to a search engine, Engadget, 2016, 9 pages. Available at: https://www.engadget.com/2016/03/30/skype-chat-bot-hands-on/.
Neural Conversation Models, Hu:toma A Deep Learning Chatbot Marketplace, 2016, 5 pages. Accessed Jan. 30, 2017 at: https://www.hutoma.com/.
We build bots, JiffyBots, 2016, 8 pages. Available at: https://jiffybots.com/.
Limam et al., "Extracting user interests from search query logs: A clustering approach", 2016, 5 pages. Available at: http://liris.cnrs.fr/Documents/Liris-4685.pdf.
Teach me to track and analyze team happiness, 2016, 8 pages. Available at: https://www.polly.ai/.
ReplyYes, E-commerce over mobile messaging, 2016, 6 pages. Available at: http://replyyes.com.
Talla ChatOps for Onboading, Training and Polling in Slack, 2016, 3 pages. Available at: https://talla.com/.
Chai, Joyce Yue, et al. "Natural Language Sales Assistant—A Web-Based Dialog System for Online Sales." IAAI. 2001.
Weston, Jason, Sumit Chopra, and Antoine Bordes. "Memory networks." arXiv preprint arXiv:1410.3916 (2014).
Weston, Jason, et al. "Towards al-complete question answering: A set of prerequisite toy tasks." arXiv preprint arXiv:1502.05698 (2015).
Dodge, Jesse, et al. "Evaluating prerequisite qualities for learning end-to-end dialog systems." arXiv preprint arXiv:1511.06931 (2015).
Cuayáhuitl, Fleriberto, and Nina Dethlefs. "Spatially-aware dialogue control using hierarchical reinforcement learning." ACM Transactions on Speech and Language Processing (TSLP) 7.3 (2011): 5.
Vinyals, Oriol, and Quoc Le. "A neural conversational model." arXiv preprint arXiv:1506.05869 (2015).
Motion AI—Chatbots made easy, 2016, 6 pages. Available at: https://www.motion.ai/.
Twyla—AI Customer Support Chat Bots, 2016, 4 pages. Available at: http://twylahelps.com/.
Stanford Core NLP—version 3.7.0, 2016, 6 pages. Available at: http://stanfordnlp.github.io/CoreNLP/.
Singh, Satinder, et al. "Optimizing dialogue management with reinforcement learning: Experiments with the NJFun system." Journal of Artificial Intelligence Research 16 (2002): 105-133.

* cited by examiner

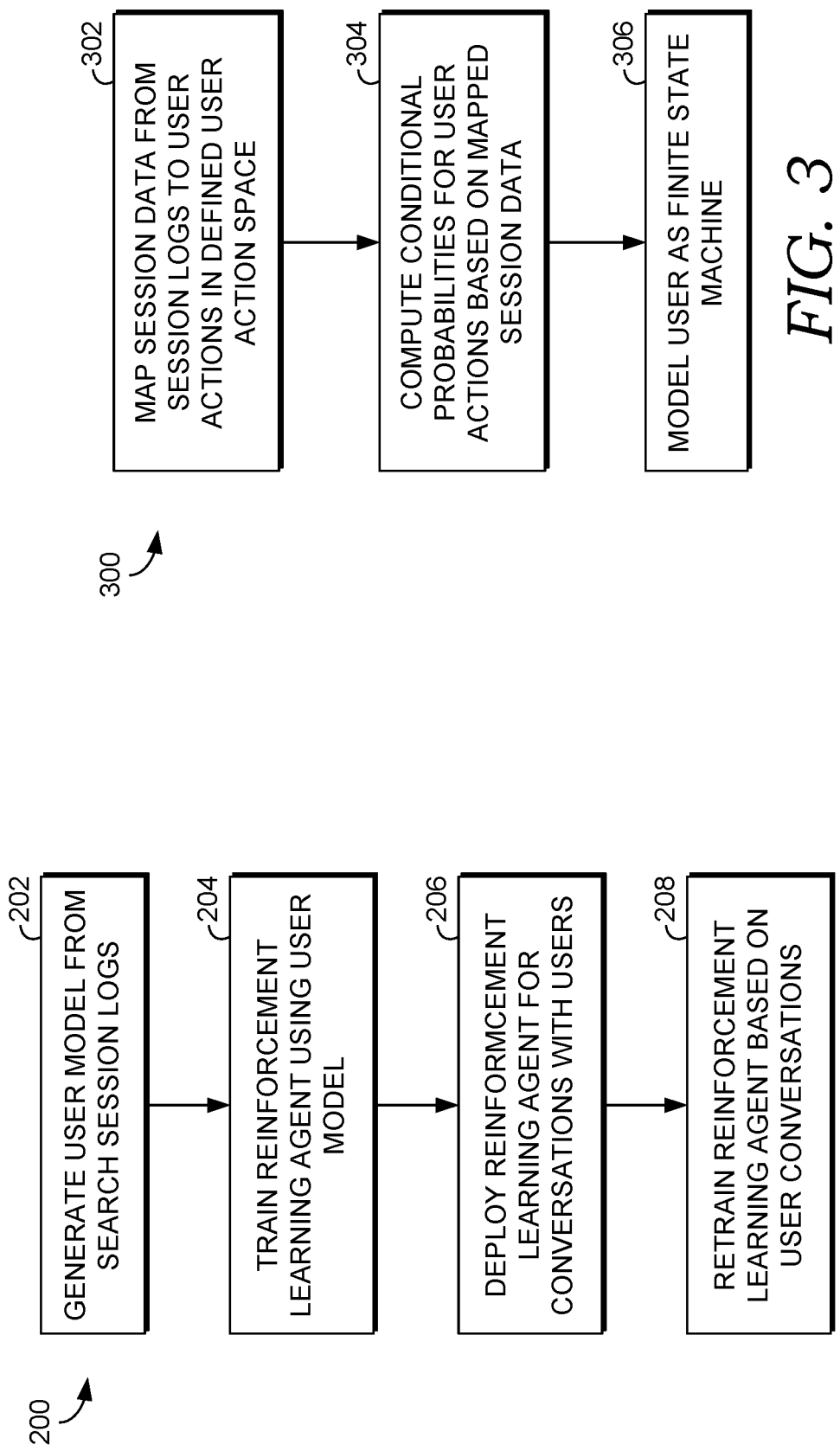

CONVERSATIONAL AGENT FOR SEARCH

BACKGROUND

Search is a continuously growing industry in today's world given the wealth of digital information that can be stored by computer systems. For instance, search is a powerful tool to allow users to search for websites and digital documents. Search can also be used to retrieve digital images and is often employed in e-commerce platforms, such as, for instance, websites dealing with products, real estate, and travel.

Conventional search engines often use a keyword search approach in which a user submits a search query with keywords to the search engine. The search engine identifies search results relevant to the keywords and returns the most relevant search results to the user. The user either finds a desired search result, or if not, submits a modified search query and the process continues until a desired search result is found or the user gives up. In some cases, conventional search engines use a faceted search approach, in which information is organized using a classification system that enables users to search for information using filters based on the classification system.

There are a number of limitations of conventional search engines. For instance, it is sometimes difficult for users to form an adequate search query. Often, the search engine returns a large number of search results, and the user is left to sift through the search results. As noted above, if the search results don't provide what the user is seeking, the user may need to continuously modify the search query. This process can be cumbersome, frustrating, and extremely time consuming for users. For instance, in the specific case of stock image sites that are used by designers for searching images, the search can go on for hours and sometimes days as the designers try to find images most suited to their use case. In these situations, search becomes much more mechanical and time consuming. Designers tend to start with broad and abstract ideas which are refined over time as the designers modify their search queries. In such cases, it is difficult for the designers to express the context and user intent using just keywords and faceted search.

SUMMARY

Embodiments of the present invention relate to, among other things, a conversational agent that can conduct conversations with users to assist with performing searches. In accordance with implementations of the present disclosure, the conversational agent is a reinforcement learning (RL) agent trained using a user model generated from existing session logs from a search engine. The user model is generated from the session logs by mapping entries from the session logs to user actions understandable by the RL agent and computing conditional probabilities of user actions occurring given previous user actions in the session logs. The RL agent is trained by conducting conversations with the user model in which the RL agent selects agent actions in response to user actions sampled using the conditional probabilities from the user model. The RL agent can subsequently be retrained by interacting with humans.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 is a flow diagram showing an overall method for training a reinforcement learning agent in accordance with some implementations of the present disclosure;

FIG. 3 is a flow diagram showing a method for generating a user model that can be used to train a reinforcement learning agent in accordance with some implementations of the present disclosure;

DETAILED DESCRIPTION

Figure 1:
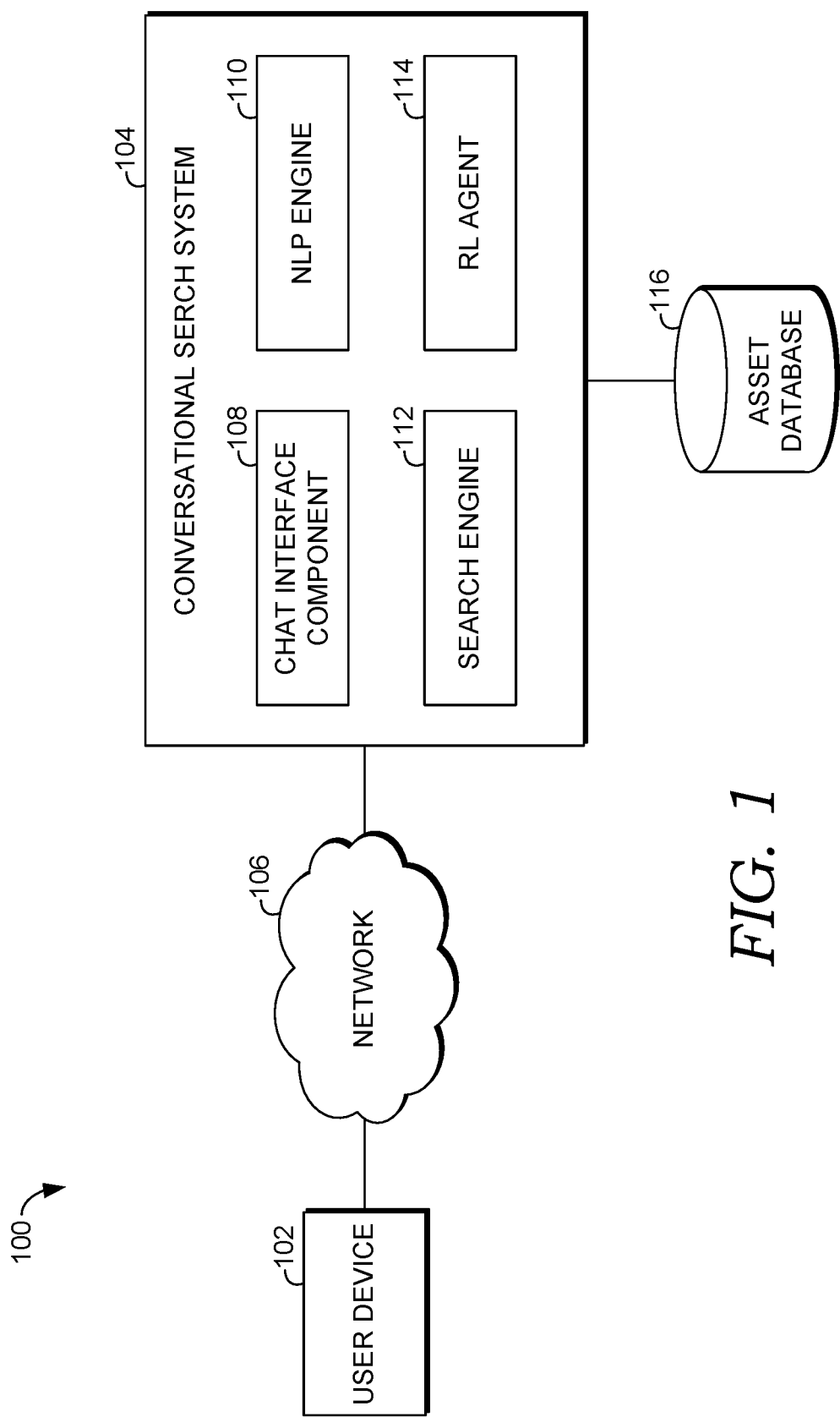
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

One way to address the shortcomings of conventional search is through use of a conversational interface that allows users to express queries (essentially what the users want) in the form of a dialogue with a conversational agent. Generally, a conversational agent (also known as a chatbot) is a computer program that can conduct a conversation with users. Conversational agents have been developed to interact with users in a variety of different settings. However, current solutions for developing conversational agents present a number of limitations for use in search.

Deep learning techniques are one solution increasingly being used for building conversational agents. In deep learning, generative models learn to generate text given an input utterance just like in the language translation task. However, deep learning requires a huge amount of training data. For instance, dialogue systems have been developed that are trained on movie subtitles datasets, question-answer banks, and other public datasets. In the context of a conversational agent, deep learning requires the availability of huge amounts of chat data to train the conversational agent. As a result, deep learning cannot be used in cases where explicit chat data is not present, which is the typical situation for search.

Rule-based approaches can also be used to develop conversational agents. However, a rule-based agent is not human-like and becomes repetitive because it only has hard-coded fixed responses. A rule-based agent also cannot handle new situations. Instead, it requires a human to formulate new rules and modify old ones each time a new situation is encountered. There are some ways to make a rule-based agent less rigid by introducing probabilities, but the process is not automated.

Embodiments of the present technology address the technical challenge of developing a conversational search system by using a reinforcement learning (RL) agent to operate as the conversational agent for the search system. The conversational search system includes a chat interface that facilitates a conversation between a user and the RL agent to perform searches. User messages entered by the user on the chat interface are processed by a natural language processing (NLP) agent that identifies a user action from the message and a search query when applicable. The identified user action and any search results obtained using a search query are provided to the RL agent, which selects an appropriate agent action to provide in response to the user. In this manner, the RL agent can interface with users and assist them with their searches by building deeper engagement. The RL agent is able to capture user intent and provide an enjoyable and more human-like experience to users along with fulfilling the users' search queries.

Reinforcement learning is used to train the RL agent using a user model developed from a search engine's session logs. Reinforcement learning involves providing rewards (positive or negative) for agent actions selected by the RL agent in response to user actions in order for the RL agent to learn an optimal policy that dictates what agent actions should be taken given different system states, including previous user and agent actions. Because conversational data is not available for typical search platforms, implementations of the present technology employ session logs from a search engine to develop a user model that can be used to select user actions when training the RL agent. The user model is generated by mapping entries in the session logs to user actions understandable by the RL agent and computing conditional probabilities that reflect the probability of certain user actions being performed given previous user actions in the session logs. When training the RL agent, the condition probabilities from the user model can be used to select user actions that occur in response to agent actions selected by the RL agent.

In addition to providing an improved search experience through a more human-like conversation, the RL agent described herein enables a variety of different use cases, such as the ones discussed below.

Most image stock platforms allow users to search images and videos based on keywords, apply search filters, and add assets to cart, among other things. While the workflow is similar to that on general e-commerce platforms, the essential difference is in the way intent is defined. In the case of e-commerce platforms, the intent is more or less defined and the user tends to choose between different brands. In the case of stock images, the major customer base (design community) tends to have an abstract notion of what they are looking for and this notion takes shape as more and more items are searched. The RL agent described herein can interact with the user to gauge intent, inform the user about the categorical options available related to a search query or probe the user about a use case at the right moment during conversations, which will help the user discover what is actually needed and provide an interactive environment to make search convenient and more engaging.

The RL agent can be used at e-commerce platforms where the prime target is to sell as many products to the user as possible. By interacting with the user, the RL agent can gauge the price range in which the user is likely to buy products and provide discounts and other lucrative offers based on what has been searched and what has already been purchased by the customers. Such an interacting RL agent would give a sense of personalization to the user.

The reinforcement learning-based approach for training the RL agent can be used in any domain, including ones in which conversational data is not available for training the RL agent. The approach described herein circumvents the need for a large amount of conversational data by creating a user model from existing session data from search engines. Such session logs contains entries like search queries, search result selections, and filter selections. A user model is generated by mapping these entries to user actions understandable by the RL agent and obtaining a probability distribution based on the occurrence of the user actions in the session data. When training the RL agent, user actions are selected by sampling from this distribution. Hence, this approach makes it feasible to develop conversational agents in search domains where conversational data is not available.

With reference now to the drawings, FIG. 1 is a block diagram illustrating an exemplary system 100 for conducting conversational searches in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with a conversational search system 104 to perform a conversational search on an asset database 116. Each of the components shown in FIG. 1 can be provided on one or more computer devices, such as the computing device 600 of FIG. 6, discussed below. As shown in FIG. 1, the user device 102 and the conversational search system 104 can communicate via the network 106, which may include, without limitation, one or more local area networks (LANs) and/or wide area networks (WANs). Such networking environments are commonplace in offices, enterprise-wide computer networks, intranets, and the Internet. It should be understood that any number of user devices and conversational search systems may be employed within the system 100 within the scope of the present invention. Each may comprise a single device or multiple devices cooperating in a distributed environment. For instance, the conversational search system 104 could be provided by multiple server devices collectively providing the functionality of the conversational search system 104 as described herein. Additionally, other components not shown may also be included within the network environment.

The conversational search system 104 is generally configured to facilitate conversational search sessions with user devices, such as the user device 102. The user device 102 can access and communicate with the conversational search system 104 via a web browser or other application running on the user device 102. The conversational search system 104 includes a chat interface component 108, which is provides a chat interface to the user device 102. The chat interface generally allows the user to conduct a conversation with the conversational search system 104 in order to obtain search results in a more human-like manner.

A user can take a number of different actions on the chat interface. The available actions the user can take may vary depending on the search system. By way of example only and not limitation, some user actions that may be enabled by the chat interface including entering a new search query, refining a search query, requesting more search results, selecting a search result, selecting a category cluster returned in response to a search query, selecting to search for assets similar to a selected search result, and adding a search result to a cart (e.g., in the case of a stock image or e-commerce platform).

Some user actions are in the form of a message entered by the user into the chat interface. In such instances, the user message is sent to a natural language processing (NLP) engine 110. The NLP engine 110 acts as a link between the chat interface and a reinforcement learning (RL) agent 114, which is responsible for determining actions to take in response to the user actions. The NLP engine 110 parses the user message and converts the user message in order to map it to system state format. This system state format is according to an RL state space representation. In particular, the RL agent 114 has a designated set of states and user actions that it understands. The job of the NLP agent 110 is to map the user message to a user action in a user action space understandable by the RL agent 114.

The NLP agent 110 can use known NLP technologies for parsing user messages. By way of example only and not limitation, the Stanford CoreNLP (http://stanfordnlp.github.io/CoreNLP/) can be used to parse the user messages. The NLP agent 110 first determines the user action from the user message. If the user action comprises a search query, the NLP agent 110 obtains the main keyword in the search query, which is the main entity/object on which the user is searching, and then extracts any surrounding keywords from the user message. The NLP agent 110 also deciphers whether the user has specifically negated something in the search query. The NLP agent 110 then creates the final query accordingly. The NLP agent 110 can also maintain a context for the user by taking into account previous queries made by the user and can provide a refined search query. For instance, if a previous search query has been submitted during the search session, the NLP agent 110 can append the previous search query depending on whether the main keyword has been changed.

Below are some example user messages and the subsequent outputs of the NLP agent 110. As can be seen from the examples below, the output of the NLP includes an identified user action and a search query when applicable. In the first example below, "cars" is the main keyword while "racing" is a surrounding keyword.

Example 1

User message: I want images of racing cars.
NLP agent output: <New Query: racing, cars>

Example 2

User message: I want more images.
NLP agent output: <Request More>

When a search query is extracted from a user message, the NLP agent 110 sends the search query to the search engine 112 which uses the search query to search an asset database 116. The asset database 116 indexes information for assets. Information for any type of asset can be indexed, such as, for instance, web sites, documents, images, products, real estate, and travel. The search engine 112 returns a search result set based on the search query. Additionally, the search engine 112 can return a score for each search result (e.g., a relevance score indicating a relevance of a search result to the search query). The search engine 112 can also provide cluster category options associated with the search results. The cluster category options allow a user to select a particular cluster category in order to view search results in the selected cluster category. Any of a variety of known search engine technology can be used to index information in the asset database 116 and to query the asset database 116, such as, for instance, the Solr or Lucene search engines.

An identification of the user action determined by the NLP engine 110 and search results (including any scores and/or cluster category options), if any, are passed to the RL agent 114. The RL agent 114 then outputs an agent action as a response to the user action according to the current system state. The current system state can include the current user action, history of the conversation (i.e., previous user actions and/or agent actions), search result scores, and other parameters, such as length of conversation. The RL agent 114 selects the agent action based on the current system state as a result of reinforcement learning used to train the RL agent 114, as will be described in further detail below. For instance, the RL agent 114 may decide to show the search results, ask the user to refine the search query if the search result scores are poor, show categorical options to help direct the user's search, prompt the user to add a search result to a cart, or bookmark a search result for later reference. The agent action can be considered optimal in the sense that it is taken at the right point during the conversation so that the user is helped and is provided a more engaging experience.

The agent action is sent to the NLP engine 110 which then generates a suitable message for the user. The generated message (and search results, in some instances) is sent to the chat interface component 108 for display via the chat interface presented on the user device 102. This process of receiving a user action via the chat interface, selecting an agent action by the RL agent 114, and returning a response to the user action via the chat interface can continue until the session is terminated.

Having provided an overview of the conversational search system 104, details of the RL agent 114 will now be further described. The domain for the RL agent 114 is defined as a conversation between two parties, a conversational agent (i.e., the RL agent 114) and a user (who is interacting with the conversational search system 104). The RL agent 114 and user alternate taking actions (i.e., agent actions and user actions, respectively), which changes the system state with the occurrence of each action, until one of them exits (i.e., a "Goodbye" state). This conversation domain is formulated as an reinforcement learning problem by defining a set of system states S, an action space A, a set of rewards R, and transition probabilities T.

The system state space is used to represent the state of the conversation. It can take into account a number of factors, including current user action, history of the conversation (i.e., a number of previous user actions and/or agent actions), search result scores, and other parameters, such as length of conversation. As such, the current system state can be represented as a vector of at least a portion of the factors.

The agent action space defines the different agent actions that can be taken by the RL agent 114. Generally, the agent actions can include showing search results, probing the user to determine the user intent, and performing miscellaneous other actions. These agent actions are described in further detail below:

Search results—The RL agent 114 can display the search results for a search query entered by the user or can provide additional search results if the user requests more.

Probe Intent—These are a set of different agent actions that the RL agent 114 takes to find out more about the user intent. By probing the user for intent, the RL agent 114 can better assist the user in finding desired search results. These include the following agent actions, which are provided by way of example only:

Use case—The RL agent 114 asks the user about the use case, such as, for instance, how or where items from the search results will be used to get better search results for the user.

Refine query—The RL agent 114 asks the user to refine the search query, so a search can then be performed using the refined search query and the context from earlier search queries.

Ask for feedback—The RL agent 114 explicitly asks the user for feedback related to search results.

Cluster categories—The RL agent 114 displays the various cluster categories related to the user's search query and/or the search results. This gives the user a list of options to choose from, essentially helping to narrow down the search query. In some cases, the cluster categories may come in form of related queries. For example, in the case of an image search, if the customer searches for "cars," the RL agent 114 may ask if the user is looking for "racing cars," "city cars," etc., or may offer the user the option of grouping the search results by artist or model or orientation.

Miscellaneous actions—A number of other agent actions may also be available. By way of example only and not limitation, below are a number of miscellaneous agent actions:

Offer—The RL agent 114 asks the user to sign up for updates or make an account on the website.

Add to cart—The RL agent 114 asks the user to add search results to a cart (or to bookmark the search results).

Anything else?—The RL agent 114 asks the user if it can help in any other way, which can allow the user to type in a new search query or can otherwise help to carry on the conversation.

Salutations—This includes greeting, thank you and goodbye actions, which the RL agent 114 takes at appropriate moments.

Help State—The RL agent 114 lists out all the possible ways in which it can assist the user. This could occur, for instance, when the user explicitly asks for help.

A user action space defines the different user actions that can be taken by the user and understood by the RL agent 114. By way of example only and not limitation, the user actions can include submitting a new search query, refining a search query, requesting more search results, selecting a search result, adding a search result to a cart, bookmarking a search result, selecting a cluster category, and searching for assets similar to a selected search result.

Reinforcement learning is used to train the RL agent 114 by running experiments that involve providing rewards (positive or negative) for agent actions selected by the RL agent 114 in response to user actions (and other system state information) in order for the RL agent 114 to learn an optimal policy. The optimal policy dictates what agent action should be taken given different systems states in order to maximize the overall rewards for a conversational session. The RL agent 114 is trained with a user model that is used to select user actions during the training. In accordance with the technology described herein, the user model is generated from session logs from a search engine (e.g., a search engine using conventional keyword searching and/or faceted search). The session logs include information regarding activity performed by users when interacting with the search engine, such as submitting search queries and selecting search results, among other actions. Because the user model is generated from session logs, this approach can be used in areas in which conversational data is not available for training the system.

With reference now to FIG. 2, a flow diagram is provided illustrating an overall method 200 for training a RL agent. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 202, a user model is generated based on activity in session logs from a search engine. The session logs include information regarding activity with the search engine, including actions such as the user submitting a search query and the user selecting a search result, among other actions. The generation of the user model is described in further detail below with reference to FIG. 3.

The RL agent is trained using the user model, as shown at block 204. This includes running reinforcement learning experiments that involve conversations between the RL agent and the user model such that the conversations are modeled as a reinforcement learning problem. Each interaction in a conversation (i.e., from a start state [Greeting state] until a terminal state [Goodbye state]) is a dialog turn that includes a user action and an agent action. Thus, the RL agent is trained over a conversation that includes a sequence of dialog turns that each includes a user action and agent action.

With each agent action that the RL agent takes, the system state changes (including a new user action governed by the user model), and a reward is provided. The RL agent observes the reward received and takes the next agent action based on the new system state. There are many approaches to learning the optimal policy in reinforcement learning. Q-learning is one such approach that can be used to find an epsilon-correct policy. The policy refers to the agent action that should be taken in a particular situation (i.e., given a certain system state). Training of an RL agent using Q-learning is described in further detail below with reference to FIG. 4. However, it should be noted that other reinforcement learning approaches, such as policy gradient, can be employed to train the RL agent using the user model.

After training, the RL agent is deployed to perform search conversations with actual users. For instance, the trained RL agent can be deployed as the RL agent 114 of the conversational system 104 in FIG. 1. After deploying the RL agent, information regarding the conversations with actual users can be tracked, including agent actions and user actions taken during the conversations. The information from the conversations can then be used to retrain the RL agent, as shown at block 208, such that the RL agent further learns based on the interactions with real users.

Turning next to FIG. 3, a flow diagram is provided that illustrates a method 300 for generating a user model that can be used to train a RL agent. As shown at block 302, entries from a search engine's session logs are mapped to user actions defined by the user action space for the RL agent. The session logs comprise entries that reflect user activities during search sessions. By mapping the entries from the session logs, each search session is represented as a series of user actions from the user action space understandable by the RL agent.

A set of rules could be employed that maps certain types of entries from the session logs to specific user actions defined by the user action space. By way of example to illustrate, below are descriptions of mappings used between entries from session logs and user actions modeled as part of user action space of the reinforcement learning environment:

NewQuery—The initial search query submitted when a search session begins is mapped as a new search query. Additionally, midway during the search session, if the most recent query submitted by the user has no intersection with previous search queries, then it can be considered as an entirely new search query.

RefineQuery—When the user searches using keywords that have some intersection with previously performed search queries, then it can be considered that the user has refined the search query, for instance, by adding/deleting words, to provide a refined search query.

RequestMore—After the user receives some search results in response to a search query and then clicks on a next button or otherwise selects to view a next set of results, this is identified as an action of the user requesting more search results.

ClickResult—The user selecting a search result is mapped to a ClickResult action.

AddToCart—There is an option to add items to a cart on some search platforms (e.g., stock images and e-commerce search platforms). Such additions to a cart are mapped to a user action corresponding to AddToCart.

ClusterCategoryClick—Search platforms often provide cluster category options with search results that allow the user to filter the search results. User selections of such options are mapped to a ClusterCategoryClick user action in the reinforcement learning environment.

SearchSimilarAsset—Suppose on looking at the search results, the user wants to search for assets similar to one of the displayed search results. In some search platforms, the user can select a "search similar" option on the user interface and a next search is made based on the selected search result. Such actions are mapped to a SearchSimilarAsset user action. Other search platforms don't have an explicit option to search for similar assets. However, user behavior in the session logs may indicate that the user has viewed a particular search result and then performed searches to try to find similar assets. The assets could be considered similar based on metadata or descriptions of the assets indexed by the search system. Such behavior could be mapped to the SearchSimilarAsset user action.

By way of example to illustrate, Table 1 below shows actions from session data for a stock image search engine mapped to user actions in the RL agent space.

TABLE 1

| Session Data | User Action |
| --- | --- |
| First search query | NewQuery |
| Query having section with previous query | RefineQuery |
| Same query with page offset | RequestMore |
| Click on search result image | ClickResult |
| Adding image to cart | AddToCart |
| Applying filter (orientation, content type) | ClusterCategoryClick |
| Search images with similar series, model | SearchSimilarAsset |

As shown at block 304, using the mapped session data, the conditional probabilities of each user action being performed given a set of previous user actions are determined: P(User action 'a'|History of actions 'h'). For instance, the conditional probabilities can be computed by aggregating the various sequences of mapped user actions from the session data that occur prior to a given user action and normalizing each of them (i.e., by dividing by the total number of sequences) resulting in a table similar to Table 2 below. The conditional probabilities reflect the likelihood of occurrences of user actions given previous user actions in the session logs. These conditional probabilities can be used as transitional probabilities for selecting next user actions when training an RL agent.

By way of example to illustrate, Table 2 provides conditional probabilities for user actions given a history of user actions from a session log. While Table 2 provides conditional probabilities based on a history of three previous user actions, it should be understood that conditional probabilities can be provided for any number of previous user actions. Additionally, it should be understood that Table 2 only provides a few conditional probabilities, and in practice, conditional probabilities would be provided for user actions for a large number of different user action histories.

TABLE 2

| User Action | History of User Actions | Conditional Probability |
| --- | --- | --- |
| ClickResult | RequestMore, Click Result, SearchSimilarAsset | 0.41 |
| RequestMore | NewQuery, RefineQuery, AddToCart | 0.13 |
| RefineQuery | SearchSimilarAsset, NewQuery, NewQuery | 0.40 |
| AddToCart | ClusterCategoryClick, NewQuery, ClusterCategoryClick | 0.01 |

Given the conditional probabilities computed at block 304, the user is modeled as a finite-state machine, as shown at block 306. As discussed in further detail below, while training the RL agent, when it is the user's turn in the conversation, the next user action is sampled using the conditional probabilities conditioned on previous user actions. In this way, the user model is a finite-state machine which changes state depending on current and previous user states in the conversation and the sampled state is used for performing the next user action.

Figure 4:
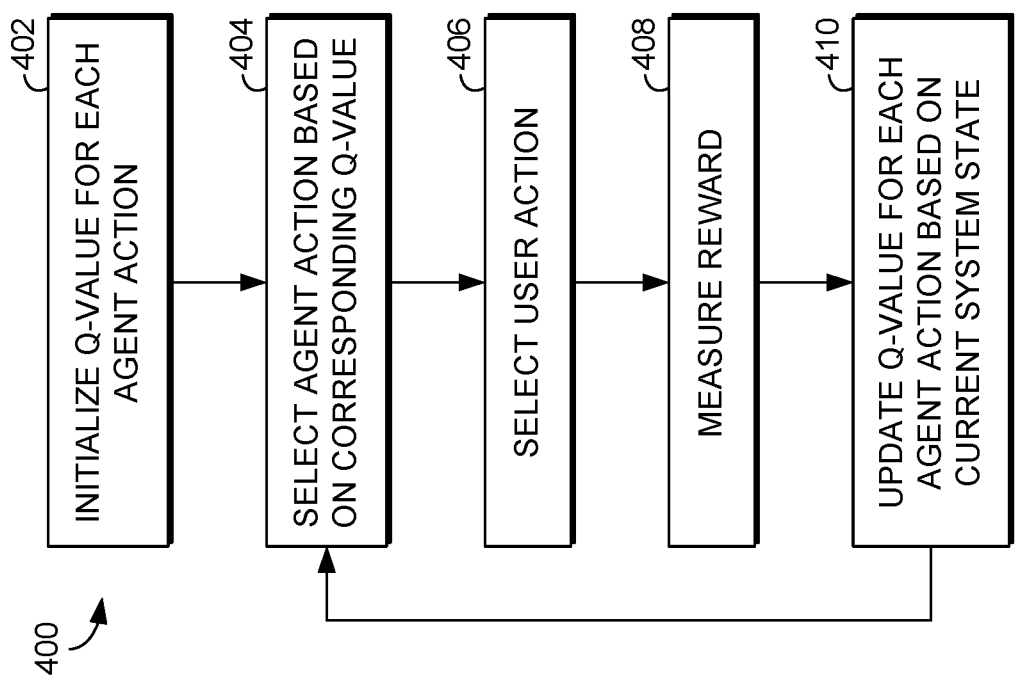
FIG. 4 is a flow diagram showing a method for using a user model to train a reinforcement learning agent in accordance with some implementations of the present disclosure.

With reference next to FIG. 4, a flow diagram is provided showing a method 400 for using a user model to train a RL agent. The method 400 utilizes Q-learning to train the RL agent. However, as noted previously, other known reinforcement learning approaches, such as policy gradient, can be used to train the RL agent.

As shown at block 402, a Q-value is initialized for each agent action available in the agent action space. As known in the art, a Q-value is a numerical value dictating which action is better. The Q-values can be initialized by setting a fixed value for each agent action. For instance, the Q-values can be initialized from a uniform distribution or all Q-values can be set to zero. As shown at block 404, an agent action is selected based on the Q-values associated with each agent action. For instance, the agent action having the highest Q-value could be selected.

A user action is selected, as shown at block 406. The user action is selected using the user model developed from session logs, for instance, using the method 300 of FIG. 3. In particular, the user action is sampled based at least in part on the conditional probabilities determined from the session logs. To incorporate the effects of the RL agent in the history, some rules can be used that dictate particular user actions with defined probabilities that could outweigh the conditional probabilities from the session logs given certain agent actions. For example, when the RL agent asks a lot of probing questions, a rule can be used to cause a negative feedback to be given by the user model with some defined probability. Similarly, if the RL agent asks the user to sign up abruptly during the conversation, a rule can be used to cause the user model to provide a negative feedback with high probability. These rules ensure that the RL agent learns not to take such agent actions. Accordingly, the user model can include probabilities for user actions not only from the session logs but predefined probabilities for user actions based on agent actions.

A reward is provided based on the current system state, including the latest user action, as shown at block 408. The rewards are numerical values that are predefined for various system states. For instance, training data could be predefined that sets a reward value for each of a number of different system states. The reward could be provided at block 408 by looking up the current system state in that training data to determine the corresponding reward value.

As shown at block 410, the Q-value for each agent action is updated based on the current system state, including the reward provided at block 408. The next agent action is then selected based on the updated Q-values, as shown by the return to block 404. The process of selecting agent and user actions, measuring the reward, and updating the Q-value for each dialog turn is repeated until a final agent and/or user action. In this way, the RL agent learns a policy to optimally select agent actions in order to maximize the overall reward for conversations.

Figure 5:
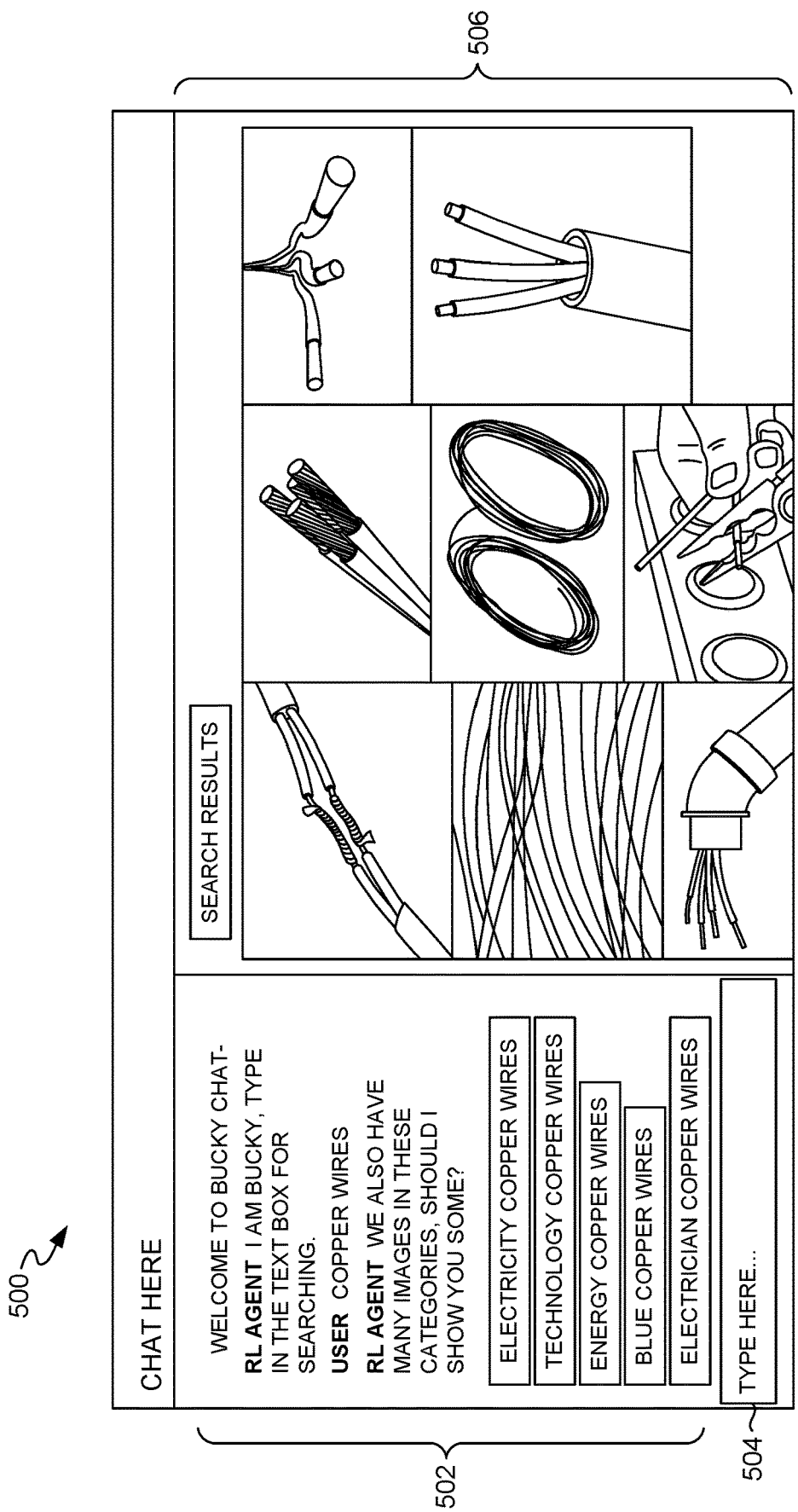
FIG. 5 is a screenshot showing an exemplary chat interface in accordance with some implementations of the present disclosure.

As discussed previously, a chat interface can be employed to facilitate a conversation between a user and an RL agent. FIG. 5 provides a screen display of an exemplary chat interface 500 that can be used in accordance with the present disclosure. It should be understood that that the chat interface 500 shown in FIG. 5 is just one of many possible chat interfaces that can be employed to conduct conversational searches.

As shown in FIG. 5, the chat interface includes a conversation pane 502. The conversation pane 502 includes a chat bar 504 where the user types in messages to converse with the RL agent. As the conversation continues, the user's input and the RL agent's responses are shown in the conversation pane 502. This provides the user with a history of the conversation. The chat interface also includes a search result pane 506, which displays search results returned by the system. In the example shown in FIG. 5, the user is searching for images related to "copper wires," and search result images are provided in the search result pane 506 in response to the search query.

This two-pane user interface makes it easy for the user to interact with the RL agent and at the same time view the search results without having to switch between pages. The users may also perform additional actions using the chat interface. For instance, although not shown in FIG. 5, a chat interface could include an option to add an item to a cart or to search for a similar item. A similar item search could be performed, for instance, by the user dragging a selected search result item from the search result pane 506 to the chat box 504.

The messages of the RL agent provide additional guidance and other options for interactions. These utterances may take many forms. For instance, the RL agent could present additional keywords or categorical options, which the user can use to refine the search query. The RL agent could probe the user to define the use case or it could prompt the user to add images to a cart or to sign up for a service. Interactions that the user performs on the chat interface 500 can be persisted in the backend database and used to define the context.

Provided below are a few sample conversations generated by user-RL agent conversations for searching stock images. In the examples below, the RL agent is referred to as "Bucky." The RL agent and user actions that can be taken in this environment have been explained in the description above. However, to clarify a few items for the example conversations below, whenever the user's utterance is an HTTP URL, this indicates the user has dragged an image into the chat box to search for similar images. The user utterance "shoppingcart" indicates the user is adding images to the shopping cart. Also, note that the RL agent asked the user questions inquiring about how the images would be used and presented options at various moments during the conversation to understand the user's intent in a better manner. Although not shown below, some of the RL agent utterances were also accompanied by sets of relevant images displayed in the chat interface.

Example 1

User: hello
RL Agent: Hi, I am Bucky. Type in the box below.
User: show some cpu
RL Agent: Here are some of the images.
User: can you show some more
RL Agent: Check out some images that we have.
User: http://exmapleimagesite.net/jpg/exampleimage1234.jpg
RL Agent: Where will you use these images?
User: in my mac
RL Agent: Results for your query.
User: shoppingcart
RL Agent: I can sign you up, search images for you, add them to your cart, and much more. Type in the box to chat.
User: show me more
RL Agent: Is there anything else you want to search?
User: yes
RL Agent: We also have many images in these categories, should I show you some?

Computer golden cpu
Technology golden cpu
Internet golden cpu
Abstract golden cpu
Chip golden cpu
User: internet golden cpu
RL Agent: Want me to get you anything else?
User: no, thanks for the help, bye.

Example 2

Figure 6:
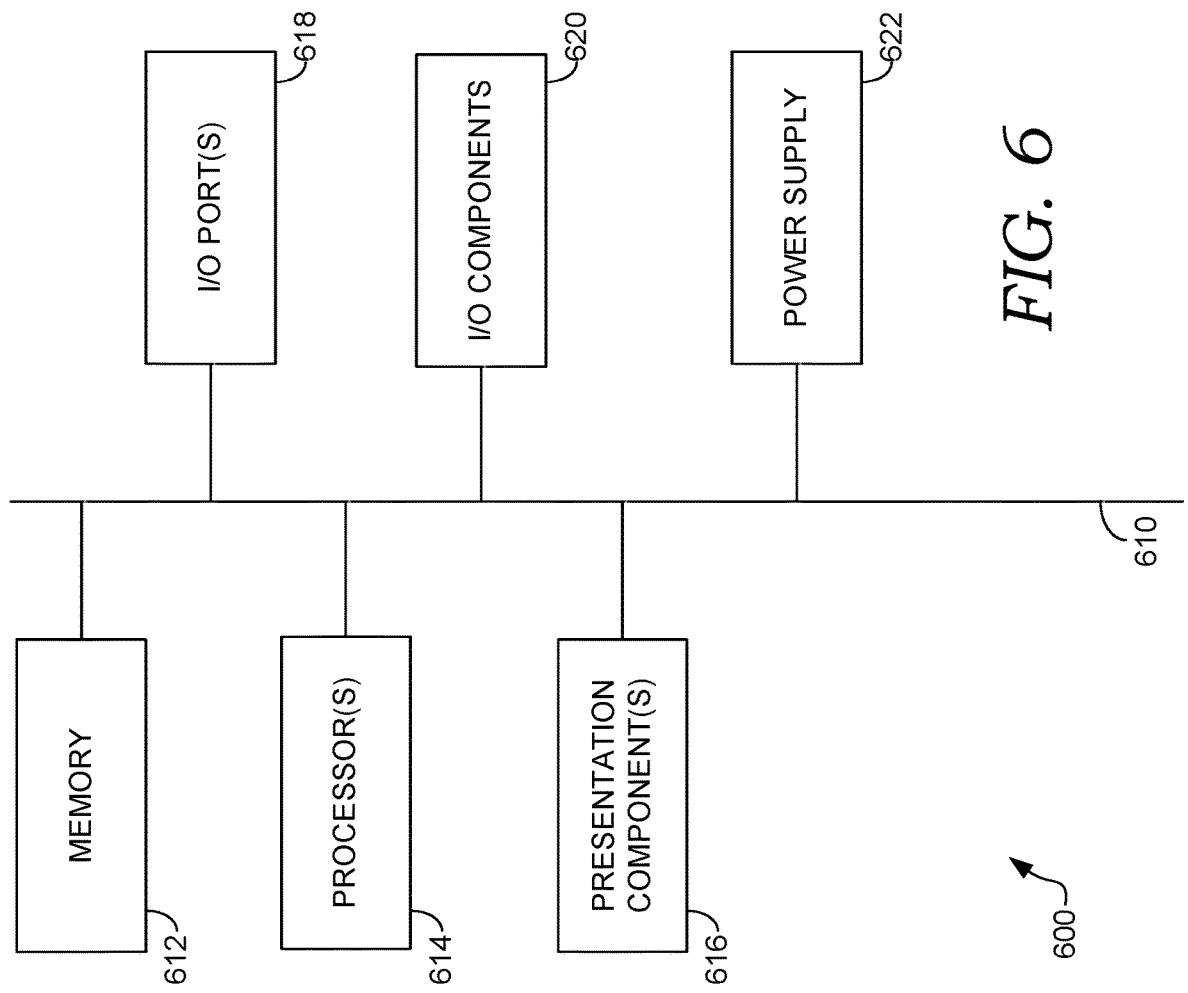
FIG. 6 is a block diagram of an exemplary computing environment suitable for use in implementations of the present disclosure.

User: hi bucky
RL Agent: Bucky this side, type in the box below.
User: show me some windows
RL Agent: Check out the images.
User: more
RL Agent: Here are some of the images.
User: more
RL Agent: Check out some images that we have.
User: http://exmapleimagesite.net/jpg/exampleimage1234 jpg
RL Agent: Refine your query further to get better results.
User: reflecting windows
RL Agent: Would you like to add something to your collections now? You can simply click on the add to cart icon.
User: shoppingcart
RL Agent: Could you refine your query further so I can get you better images?
User: shining reflecting windows
RL Agent: You could add the images to your cart for better exploration, click on the cart icon.
User: no
RL Agent: Where will you use these images?
User: i will use them for construction designs.
RL Agent: Here you go, these are some of the best matches for your query.
User: cool, bye Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

As described above, implementations of the present disclosure relate to a conversational search system that facilitates conversational searches using a reinforcement learning agent trained using a user model generated using session logs from a search engine. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
   one or more processors; and
   one or more computer storage media storing computer-useable instructions that, when used by the one or more processors, cause the one or more processors to:
   generate a user model using session logs from a search engine, the session logs comprising user activities during search sessions that do not include conversation data, the user model generated by:
      employing a set of rules with mappings between certain types of session log entries to specific user actions defined by a user action space understandable by a reinforcement learning agent to represent entries from the session logs as user actions from the user action space and each search session within the session logs as a series of user actions from the user action space, and
      using the mapped entries from the session logs to compute conditional probabilities for user actions from the user action space for each of a plurality of different sets of previous user actions;
   train the reinforcement learning agent using the user model by iteratively performing dialog turns of selecting an agent action and selecting a user action, wherein the user actions are selected during the dialog turns based at least in part on the conditional probabilities from the user model; and
   employing the reinforcement learning agent as a conversational agent in a conversational search system.

2. The system of claim 1, wherein the user model further comprises predefined probabilities for user actions defined by the user action space given various sets of previous agent actions by the reinforcement learning agent, and wherein the user actions are selected during the dialog turns based at least in part on the predefined probabilities.

3. The system of claim 1, wherein the user actions defined by the user action space include one or more selected from the following: submitting a new search query, refining a search query, requesting more search result, selecting a search result, adding a search result to a cart, bookmarking a search result, selecting a cluster category, and searching for assets similar to a selected search result.

4. The system of claim 1, wherein the agent action selected at each dialog turn is selected from an agent action space setting forth available agent actions for the reinforcement learning agent, wherein the agent action space includes one or more selected from the following: providing search results, asking for a use case, asking to refine a search query, asking for feedback, providing cluster categories, providing an offer to sign up, asking to add a search result item to a cart, providing a salutation, and providing help information.

5. The system of claim 1, wherein the agent action selected at each dialog turn is based on a current system state and expected reward values.

6. The system of claim 5, wherein the current system state is a vector comprising a value for at least one or more of the following parameters: a current user action, one or more previous user actions, one or more previous agent actions, search result scores, and length of conversation.

7. The system of claim 1, wherein reinforcement learning agent is trained using Q-learning.

8. The system of claim 1, wherein the reward provided at each dialog turn is based on a current system state by looking up a reward value in predefined data setting a reward value for each of a plurality of system states.

9. One or more computer storage media storing computer-useable instructions that, when executed by a computing device, cause the computing device to perform operations, the operations comprising:
   generating a user model from entries in session logs from a search engine, the entries representing user activity during search sessions with the search engine that do not include conversation data, the user model generated by employing a set of rules with mapping between certain types of session log entries to specific user actions defined by a user action space understandable by a reinforcement learning agent to represent entries from the session logs as user actions from the user action space and each search session within the session logs as a series of user actions from the user action space;
   training the reinforcement learning agent by using the user model to select user actions during training dialog turns; and
   employing the reinforcement learning agent as a conversational agent in a conversational search system.

10. The one or more computer storage media of claim 9, wherein the user model comprises conditional probabilities for user actions given various sets of previous user actions, the conditional probabilities calculated from the entries in the session logs, and wherein the user actions are selected during the training dialog turns based at least in part on the conditional probabilities.

11. The one or more computer storage media of claim 10, wherein the user model further comprises predefined probabilities for user actions given various sets of previous agent actions by the reinforcement learning agent, and wherein the user actions are selected during the training dialog turns based at least in part on the predefined probabilities.

12. The one or more computer storage media of claim 9, wherein generating the user model comprises:
- computing conditional probabilities for user actions from the user action space given different sets of previous user actions, the conditional probabilities being calculated from the mapped entries from the session logs; and
- generating the user model as a finite state machine using the conditional probabilities.

13. The one or more computer storage media of claim 9, wherein the user actions defined by the user action space include one or more selected from the following: submitting a new search query, refining a search query, requesting more search result, selecting a search result, adding a search result to a cart, bookmarking a search result, selecting a cluster category, and searching for assets similar to a selected search result.

14. The one or more computer storage media of claim 9, wherein training the reinforcement learning agent comprises performing a reinforcement learning conversation with the reinforcement learning agent and the user model, wherein the reinforcement learning conversation comprises a series of dialog turns, each dialog turn including an interaction involving a selected agent action and a selected user action, wherein a reward provided for each dialog turn, and wherein the user action is selected at each dialog turn based on the user model and the agent action is selected at each dialog turn to maximize an overall reward provided from the dialog turns of the reinforcement learning conversation.

15. The one or more computer storage media of claim 9, wherein training the reinforcement learning agent comprises:
- initializing a Q-value for each agent action defined by an agent action space;
- selecting a first agent action based on the initialized Q-values; and
- iteratively:
  - employing the user model to select a current user action;
  - measuring a reward based on the current system state;
  - updating the Q-value for each agent action based on the current system state; and
  - selecting a next agent action based on the updated Q-values.

16. The one or more computer storage media of claim 15, the current system state is a vector comprising a value for at least one or more of the following parameters: the current user action, one or more previous user actions, one or more previous agent actions, search result scores, and length of conversation.

17. The one or more computer storage media of claim 15, wherein measuring a reward based on the current system state comprises looking up a reward value in predefined data setting a reward value for each of a plurality of system states.

18. The one or more computer storage media of claim 9, wherein the operations further comprise retraining the reinforcement learning agent using interactions with humans.

19. A computer system comprising:
- means for generating a user model having conditional probabilities for user actions based on entries in session logs from a search engine, the entries in the session logs comprising user activities during search sessions that do not include conversation data, the user model generated using a set of rules with mappings between certain types of session log entries to specific user actions defined by a user action space understandable by a reinforcement learning agent to represent entries from the session logs as user actions from the user action space and each search session within the session logs as a series of user actions from the user action space; and
- means for training a reinforcement learning agent by using the user model to select user actions during training dialog turns based at least in part on the conditional probabilities of the user model.

* * * * *